(No Model.) 10 Sheets—Sheet 1.

S. F. DUNCAN & A. M. WILLARD.
MACHINE FOR MAKING STAY PIECES AND GUARDS FOR WIRE FENCES.

No. 432,123. Patented July 15, 1890.

Witnesses:
Albert H. Adams
Harry T. Jones

Inventors:
Sylvester F. Duncan
Arthur M. Willard (No Model.) 10 Sheets—Sheet 2.

S. F. DUNCAN & A. M. WILLARD.
MACHINE FOR MAKING STAY PIECES AND GUARDS FOR WIRE FENCES.

No. 432,123. Patented July 15, 1890.

Witnesses: Inventors:
Albert N. Adams. Sylvester F. Duncan
Harry T. Jones. Arthur M. Willard (No Model.) 10 Sheets—Sheet 3.

S. F. DUNCAN & A. M. WILLARD.
MACHINE FOR MAKING STAY PIECES AND GUARDS FOR WIRE FENCES.

No. 432,123. Patented July 15, 1890.

(No Model.) 10 Sheets—Sheet 4.

S. F. DUNCAN & A. M. WILLARD.
MACHINE FOR MAKING STAY PIECES AND GUARDS FOR WIRE FENCES.

No. 432,123. Patented July 15, 1890.

(No Model.) 10 Sheets—Sheet 5.

S. F. DUNCAN & A. M. WILLARD.
MACHINE FOR MAKING STAY PIECES AND GUARDS FOR WIRE FENCES.

No. 432,123. Patented July 15, 1890.

(No Model.) 10 Sheets—Sheet 7.

S. F. DUNCAN & A. M. WILLARD.
MACHINE FOR MAKING STAY PIECES AND GUARDS FOR WIRE FENCES.

No. 432,123. Patented July 15, 1890.

Witnesses: Albert H. Adams, Harry F. Jones.

Inventors: Sylvester F. Duncan, Arthur M. Willard.

(No Model.) 10 Sheets—Sheet 8.

S. F. DUNCAN & A. M. WILLARD.
MACHINE FOR MAKING STAY PIECES AND GUARDS FOR WIRE FENCES.

No. 432,123. Patented July 15, 1890.

Witnesses: Albert N. Adams. Harry T. Jones.

Inventors: Sylvester F. Duncan, Arthur M. Willard.

(No Model.) 10 Sheets—Sheet 9.
S. F. DUNCAN & A. M. WILLARD.
MACHINE FOR MAKING STAY PIECES AND GUARDS FOR WIRE FENCES.
No. 432,123. Patented July 15, 1890.
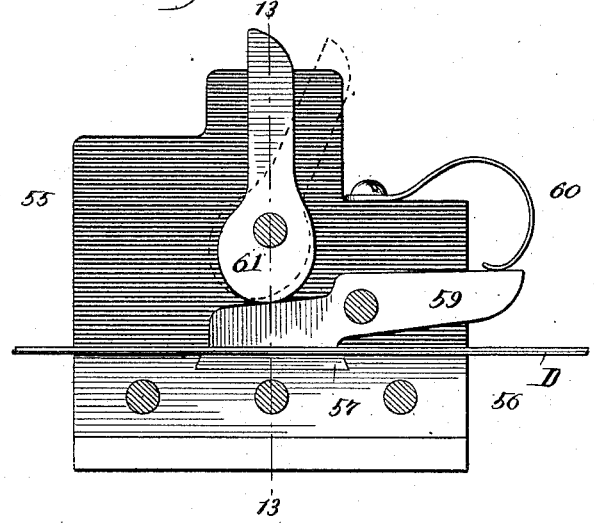
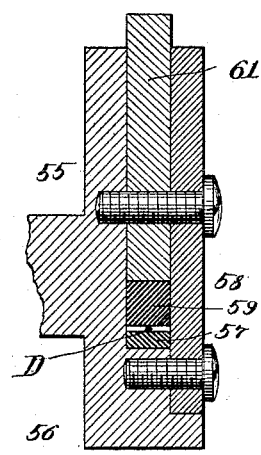
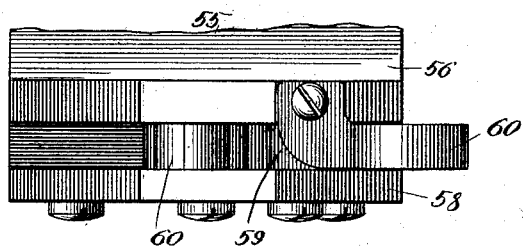
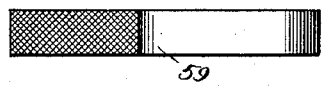
Witnesses:
Albert H. Adams.
Harry T. Jones.
Inventors:
Sylvester F. Duncan
Arthur M. Willard
THE NORRIS PETERS CO., PHOTO-LITHO., WASHINGTON, D. C.

(No Model.) 10 Sheets—Sheet 10.
S. F. DUNCAN & A. M. WILLARD.
MACHINE FOR MAKING STAY PIECES AND GUARDS FOR WIRE FENCES.
No. 432,123. Patented July 15, 1890.
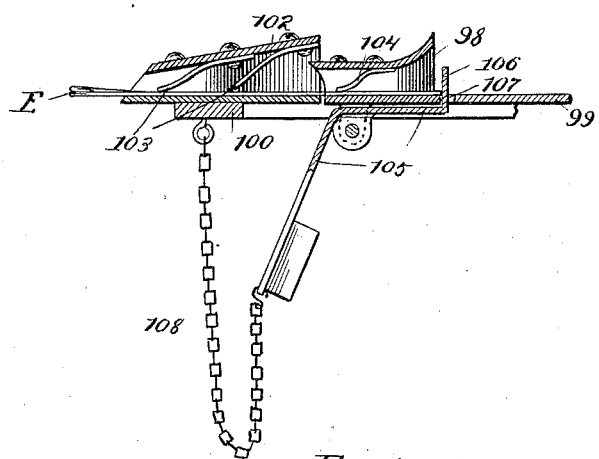
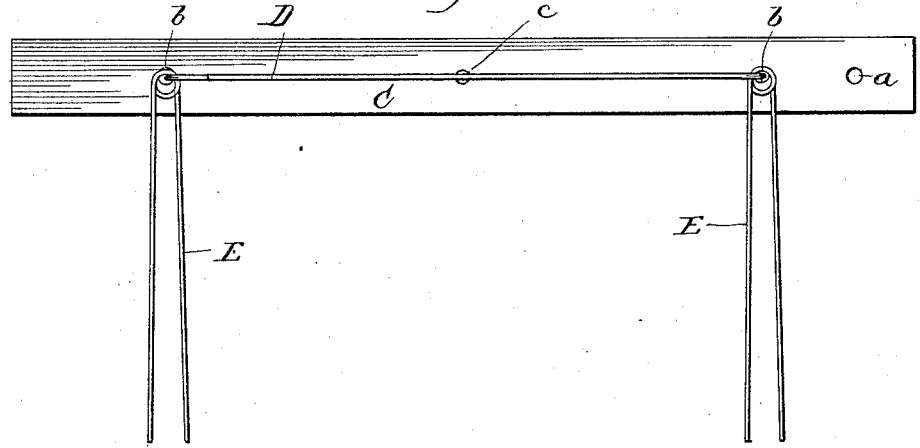

UNITED STATES PATENT OFFICE.

SYLVESTER F. DUNCAN AND ARTHUR M. WILLARD, OF CHICAGO, ILLINOIS, ASSIGNORS TO THE WIRE FENCE IMPROVEMENT COMPANY, OF SAME PLACE.

MACHINE FOR MAKING STAY-PIECES AND GUARDS FOR WIRE FENCES.

SPECIFICATION forming part of Letters Patent No. 432,123, dated July 15, 1890.

Application filed October 17, 1889. Serial No. 327,365. (No model.)

*To all whom it may concern:*

Be it known that we, SYLVESTER F. DUNCAN and ARTHUR M. WILLARD, residing at Chicago, in the county of Cook and State of Illinois, and citizens of the United States, have invented certain new and useful Improvements in Machines for Making Stay-Pieces and Guards for Wire Fences, of which the following is a specification, reference being had to the accompanying drawings, in which—

Figure 1:
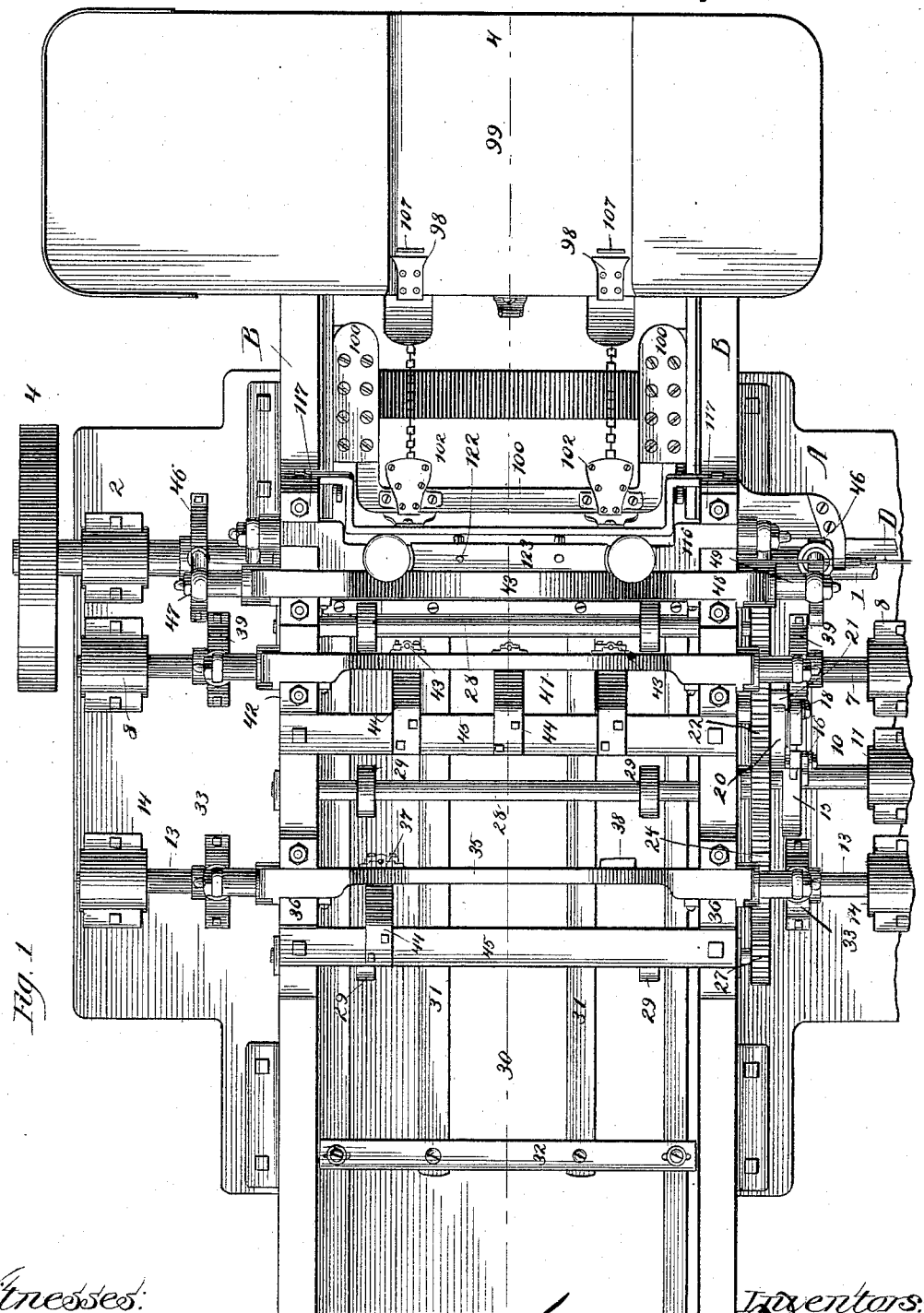
Figure 2:
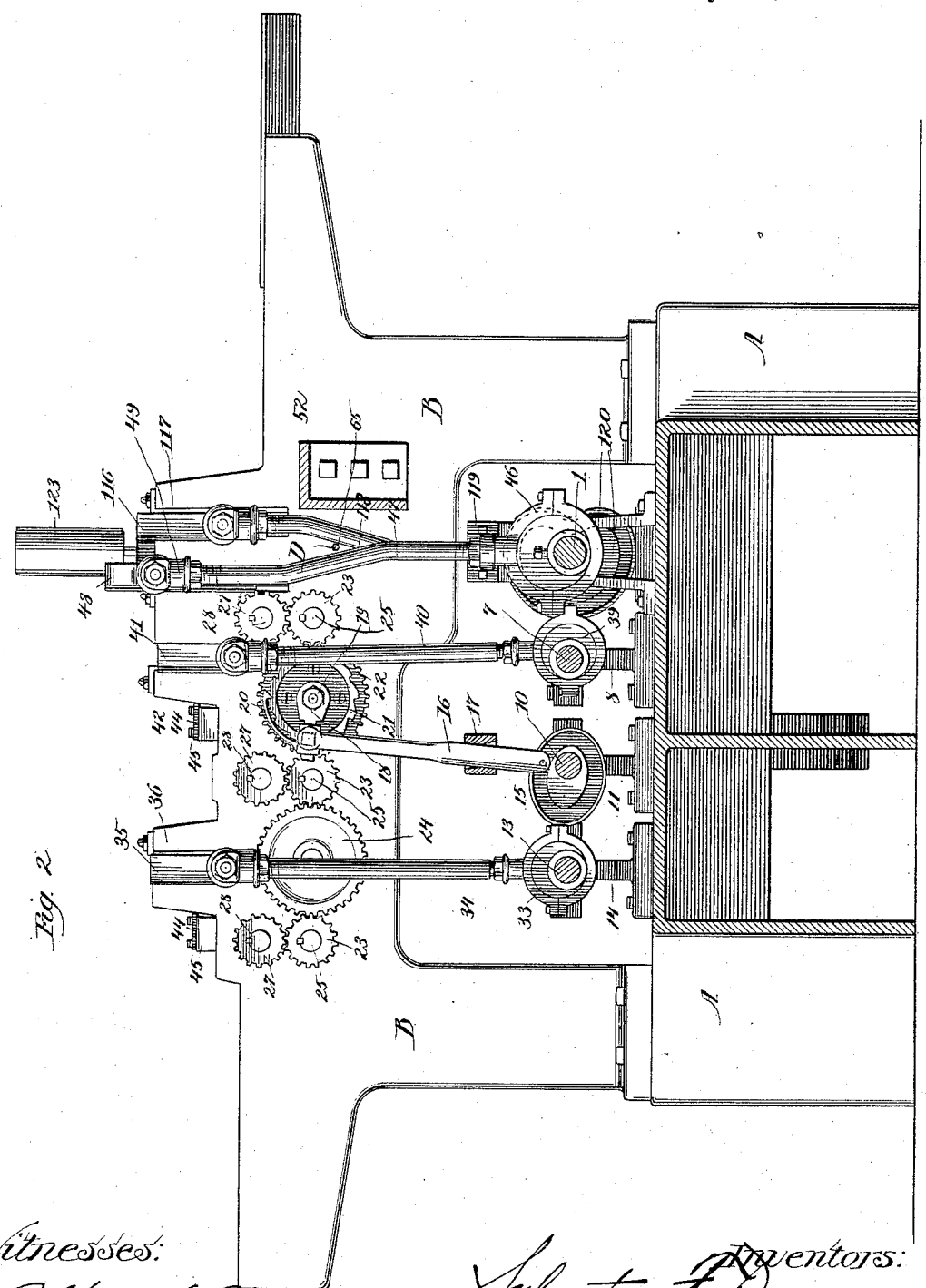
Figure 3:
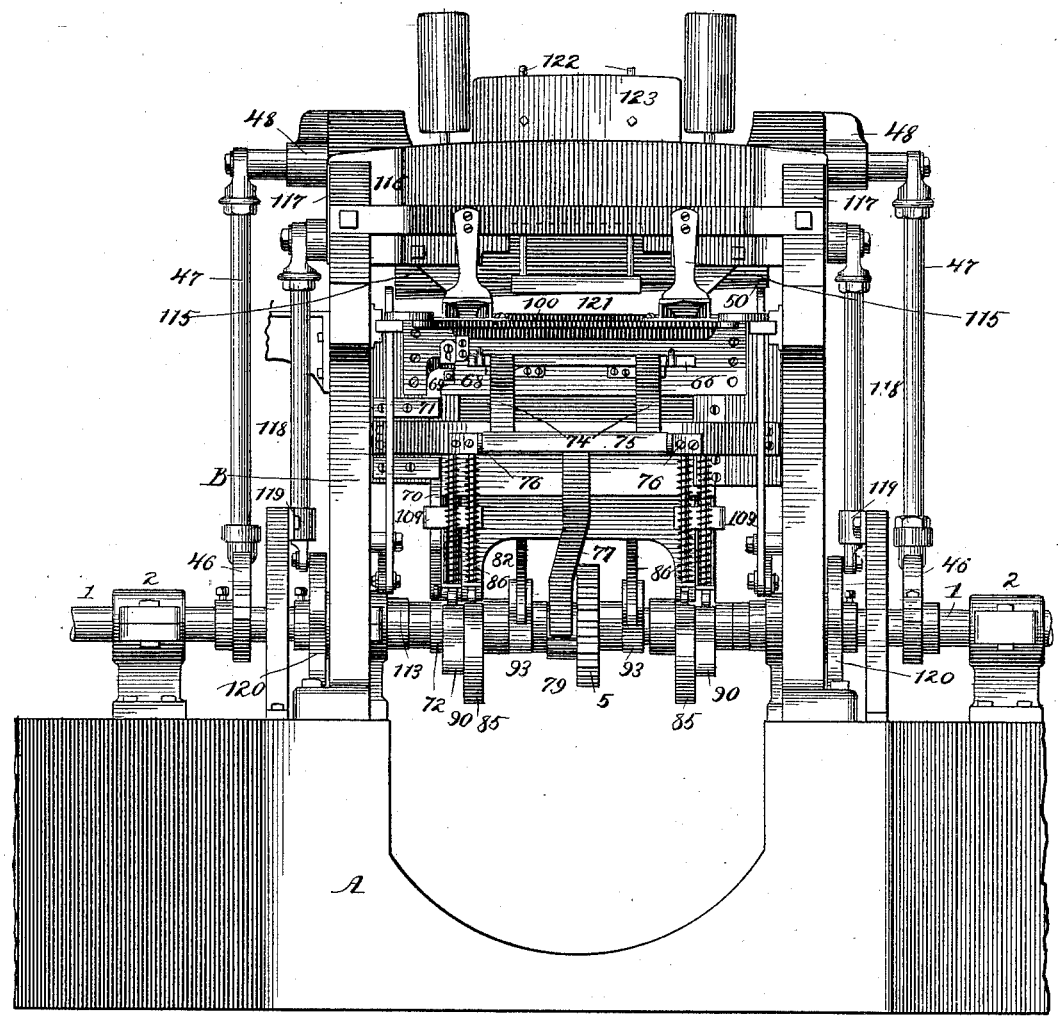
Figure 4:
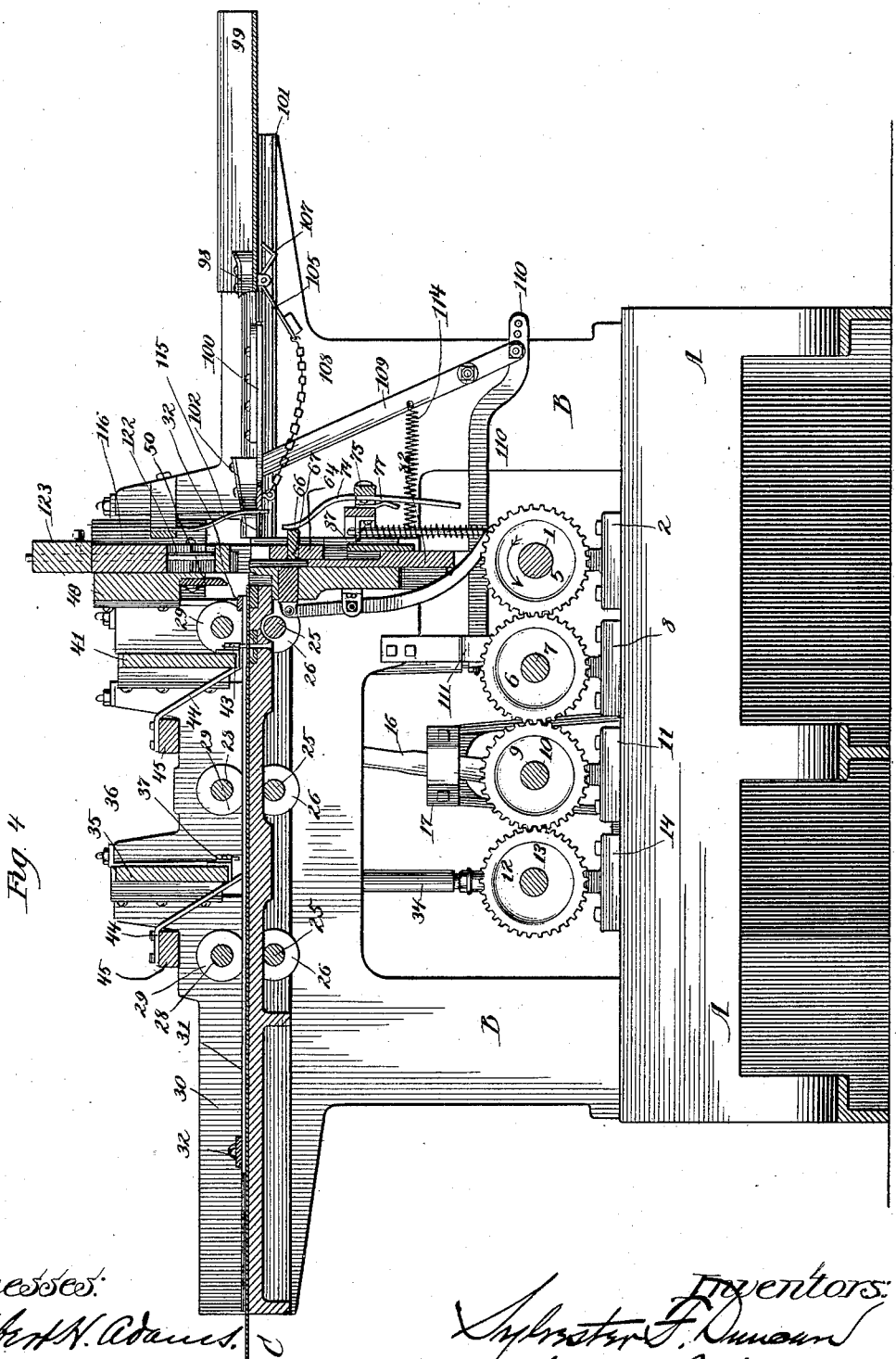
Figure 5:
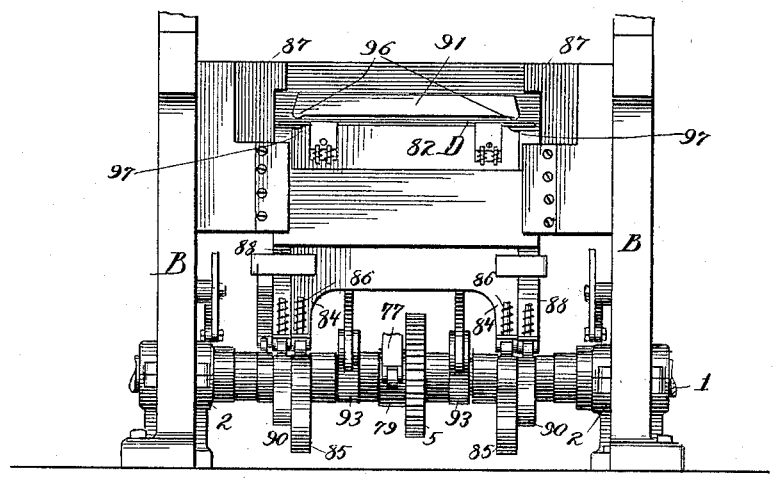
Figure 6:
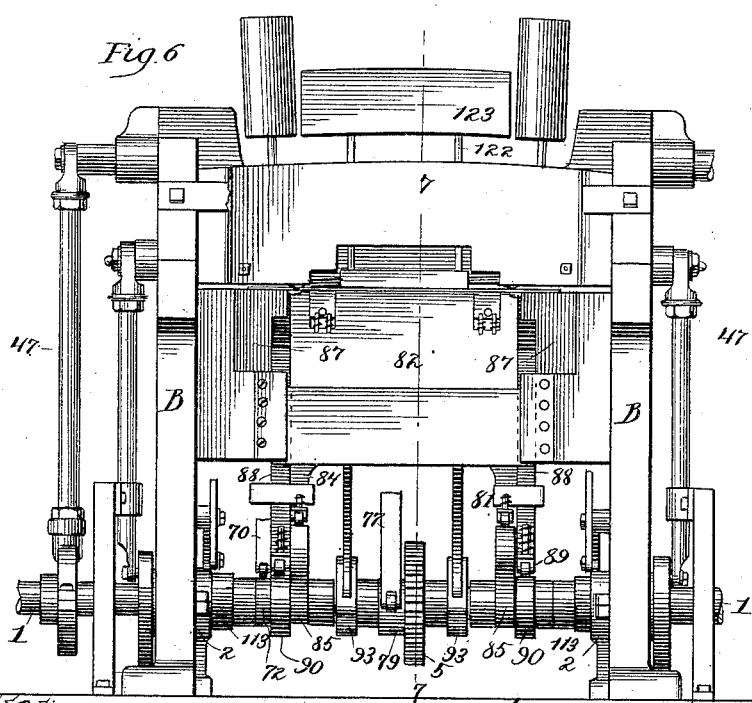
Figure 7:
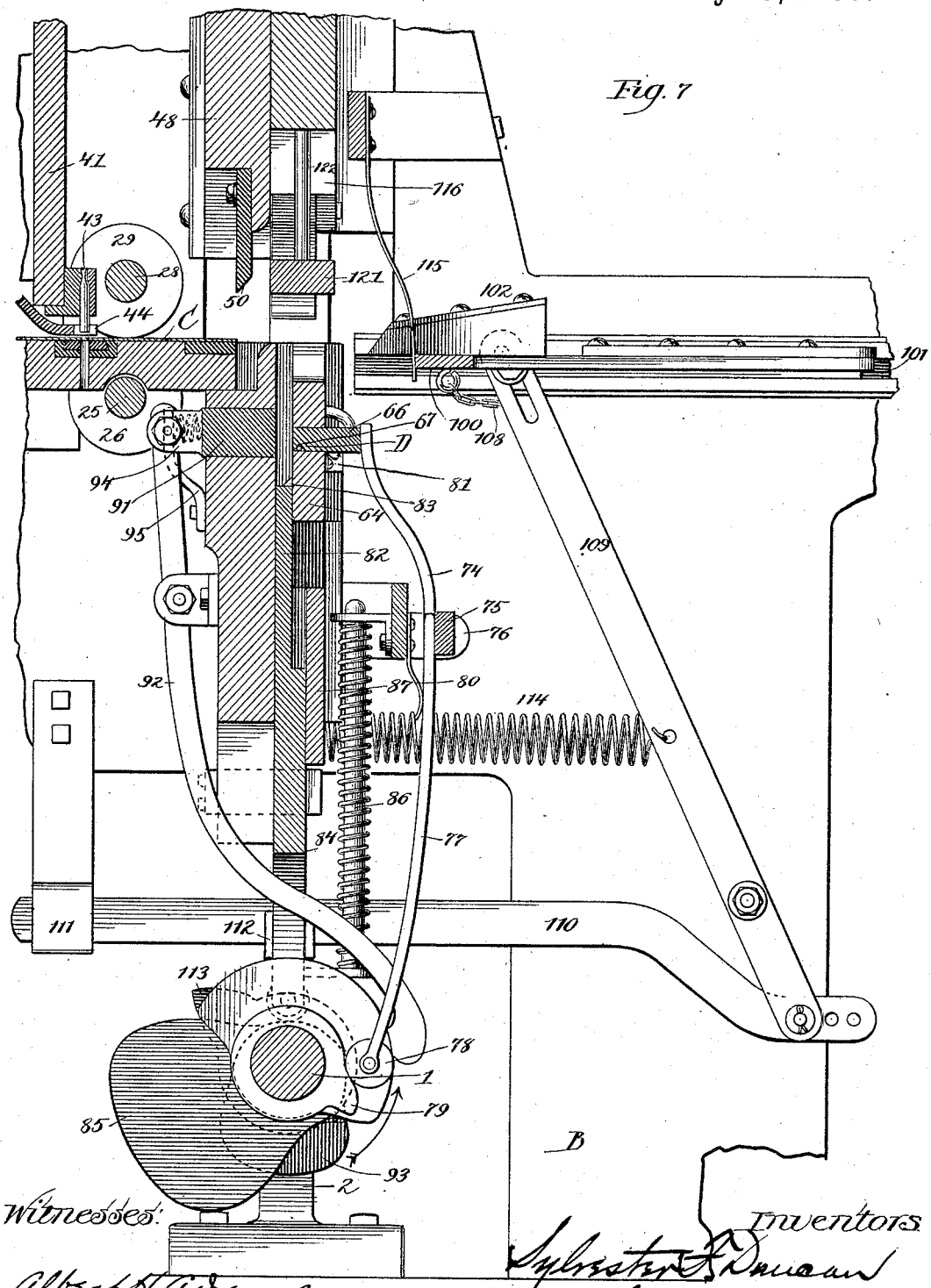
Figure 8:
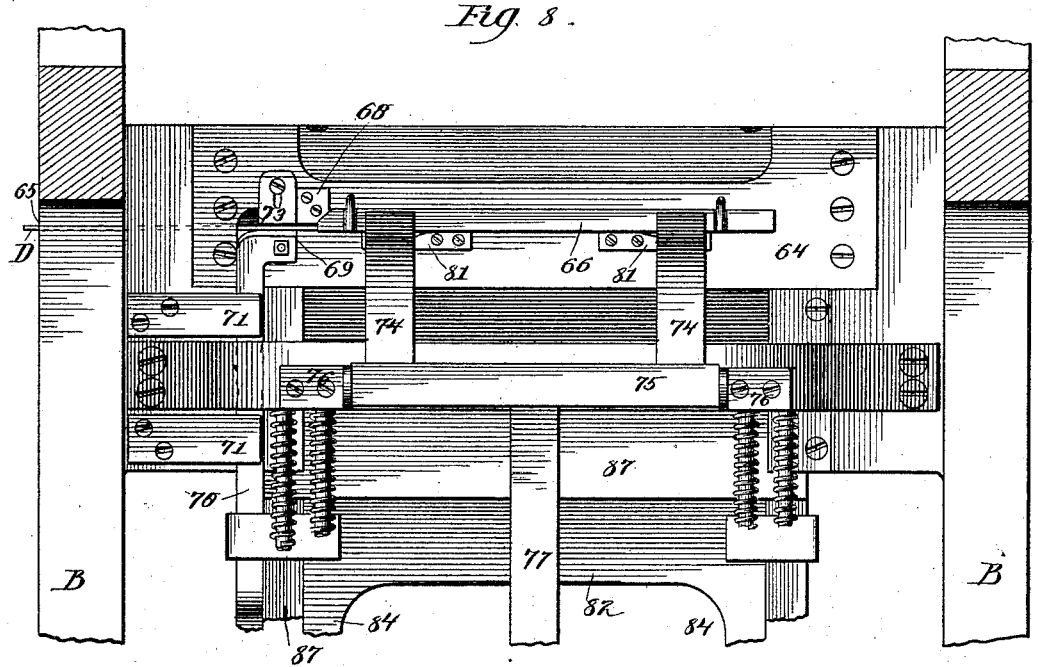
Figure 9:
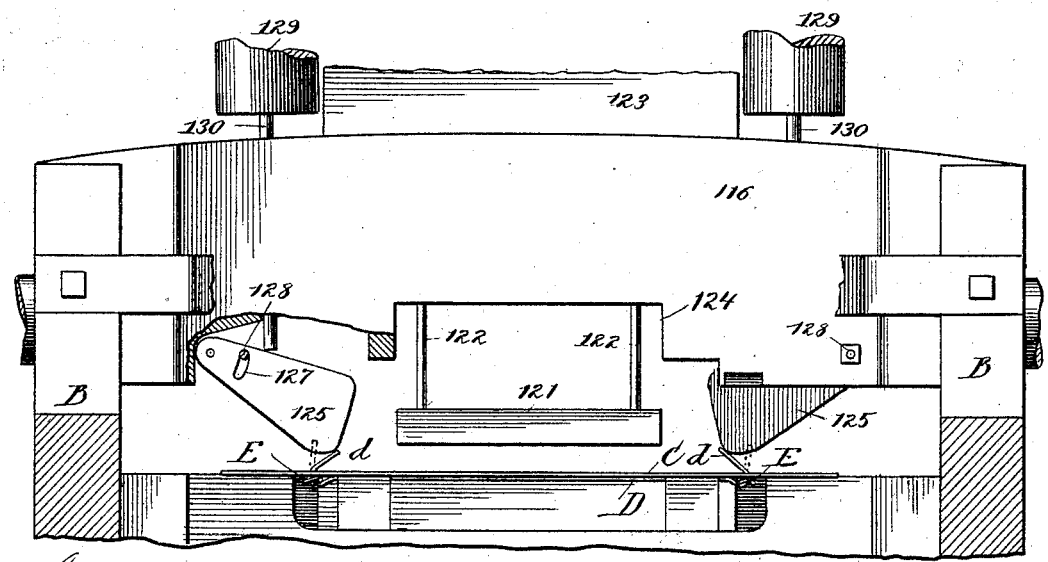
Figure 10:
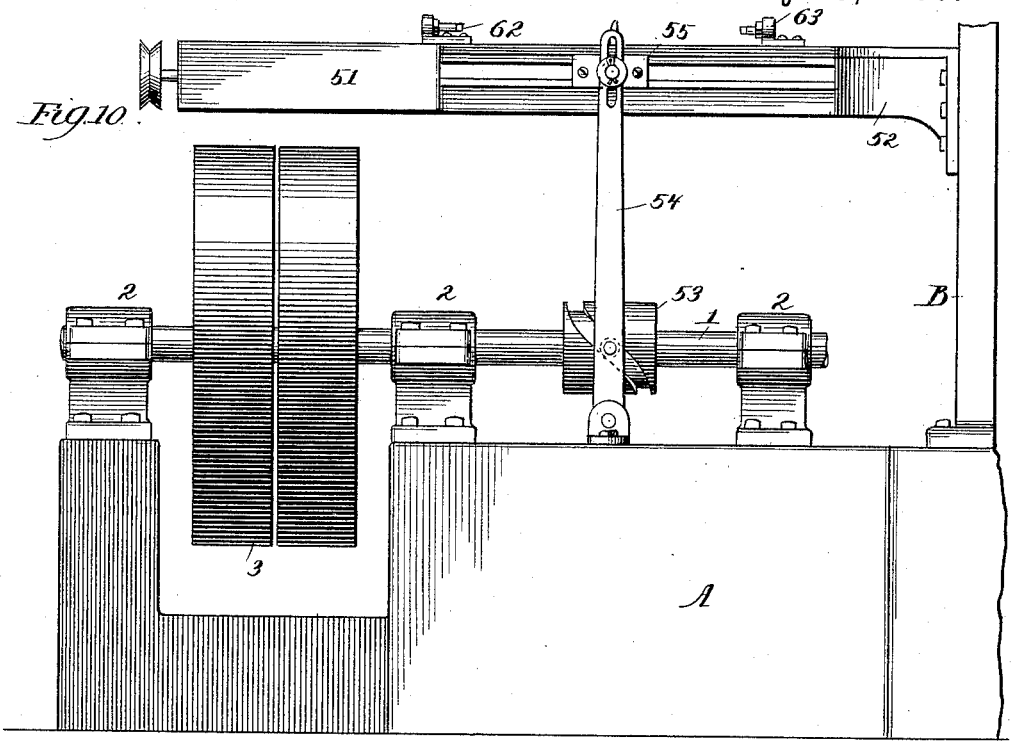
Figure 11:
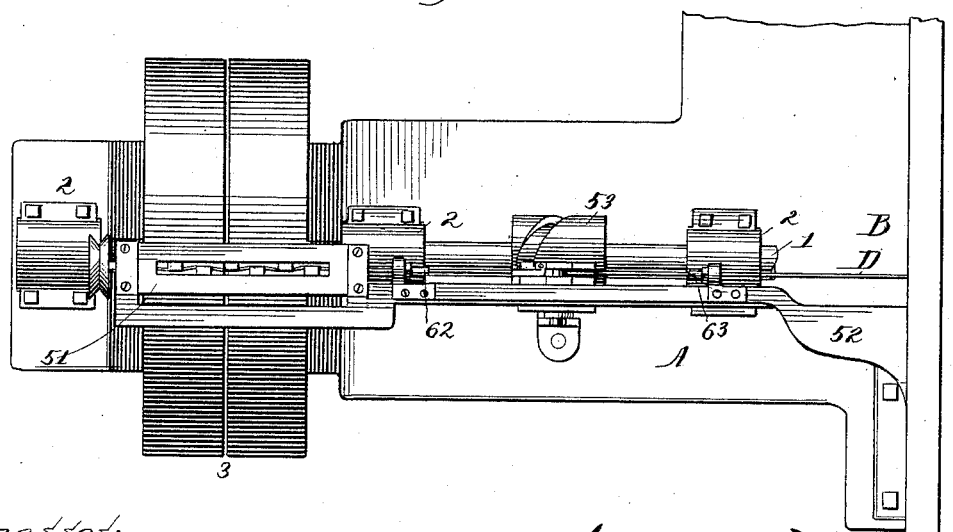

Figure 1 is a top or plan view. Fig. 2 is a side elevation, some parts being in section. Fig. 3 is a front elevation, the feed-table being removed. Fig. 4 is a longitudinal section at line 4 4 of Fig. 1. Fig. 5 is a partial front elevation, some parts being broken away. Fig. 6 is a front elevation, some parts being removed, showing the devices in a different position from that shown in Fig. 3. Fig. 7 is an enlarged detail, being a vertical section at line 7 7 of Fig. 6. Fig. 8 is an enlarged detail, being a front elevation of the devices for severing the wire. Fig. 9 is an enlarged detail, being a front elevation of the devices for bending down the ends of the wire. Fig. 10 is a detail, being a side elevation of the devices for feeding in the wire. Fig. 11 is a detail, being a top or plan view of the devices for feeding in the wire. Fig. 12 is an enlarged detail, being a central longitudinal section through the clamp for feeding in the wire. Fig. 13 is a cross-section at line 13 13 of Fig. 12. Fig. 14 is a top or plan view of the clamp. Fig. 15 is an under side view of the movable jaw of the clamp. Fig. 16 is an enlarged detail, being a section through the device for feeding in the wire loops. Fig. 17 is an enlarged detail showing a completed stay-piece and guard.

The object of this invention is to construct a machine for making stay-pieces and guards for wire fences of the class shown in Letters Patent of the United States No. 356,711, dated January 25, 1887, granted to Sylvester F. Duncan, which we accomplish as illustrated in the drawings, and as hereinafter described.

That which we claim as new will be pointed out in the claims.

In the drawings, A represents the base upon which the machine is supported.

B represents the frame of the machine. This frame B is made in the form shown and is provided with bearings for supporting the several parts of the machine, as hereinafter specified.

C represents a sheet of metal, from which the strips which form the stay-pieces and guards are severed.

D represents the wire from which the parallel piece or pieces of wire are severed.

E represents the loops of wire, which are fed into the machine by hand, and which furnish the means for securing the stay and guard to the wires of the fence. The completed stay and guard is shown in Fig. 17 of the drawings.

1 is the driving-shaft. This shaft 1 is supported in bearings 2, secured on the base A. It is provided with a driving-pulley 3 on one side of the machine, as shown in Figs. 10 and 11 and with a balance-wheel 4 on the opposite side of the machine, as shown in Fig. 1.

5 is a gear-wheel secured on the shaft 1, as shown in Figs. 3 and 4. This wheel 5 meshes with a gear-wheel 6, secured on a shaft 7, as shown in Fig. 4, which shaft 7 is mounted in suitable bearings 8, secured on the base A, as shown in Figs. 1, 2, and 4. The wheel 6 also meshes with a gear-wheel 9, as shown in Fig. 4, which is secured on a shaft 10, which is mounted in suitable bearings 11, secured on the base A, as shown in Figs. 1, 2, and 4. The gear-wheel 9 also meshes with a gear-wheel 12, as shown in Fig. 4, which is secured on a shaft 13, which is mounted in suitable bearings 14, secured on the base A, as shown in Figs. 1, 2, and 4.

15 is a disk which has a cam-groove in its face, as shown in Fig. 2, and is secured on the shaft 10 near its outer end, as shown in Fig. 1.

16 is a pitman provided with a projection to engage with the cam-disk 15 and working vertically in a guide 17, as shown in Figs. 2 and 4. The upper end of the pitman 16 is pivoted to an arm 18, which is loosely mounted on a journal 19, which journal is mounted in bearings near the top of the frame B. The arm 18 is provided with a pawl 20, which engages with a ratchet-wheel 21, secured to the face of a gear-wheel 22, as shown in Figs. 1 and 2, which gear-wheel 22 is mounted on the journal 19. Each reciprocation of the pitman 16 by means of the pawl 20 and ratchet 21 rotates the wheel 22 a partial rotation.

23 indicates three small gear-wheels, two of which are driven directly by the gear-wheel 22, and the third is driven by means of an idler-wheel 24, as shown in Fig. 2. These gear-wheels 23 are secured on shafts 25, which are mounted in bearings in the frame B, and are provided with rollers 26, over which the sheet of metal C passes. Each gear-wheel 23 meshes with a similar wheel 27, mounted on a shaft 28, which is supported in bearings in the frame B, and each of the shafts 28 is provided with a roller 29, corresponding to the rollers 26 on the shafts 25, as shown in Fig. 4. The sheet of metal C is fed into the machine on a table 30 between the rollers 26 and the roller 29, as shown in Figs. 1 and 4. Each reciprocation of the pitman 16 rotates the wheel 22 and through it the rollers 26 and 29 sufficiently to advance the sheet of metal C, which is firmly held between the rollers, a distance equal to the width of a single stay-piece and guard.

31 represents two bars secured on cross-bars 32 on the table 30, as shown in Figs. 1 and 4. The sheet of metal C passes between the bars 31 and the table 30.

33 represents two eccentrics on the shaft 13, one on each side of the machine, as shown in Fig. 1. As shown in Fig. 2, the connecting-rods 34 of the eccentrics 33 are pivoted at their upper ends to a cross-bar 35, which moves in vertical guides 36 in the frame B, as shown in Figs. 1, 2, and 4. On one end of the cross-bar 35 is secured a punch 37, which punches a hole $a$ (see Fig. 17) in the sheet of metal C. On the opposite end of the cross-bar 35 is secured a stamp 38, as shown in Fig. 1, which stamps the date of the patent, the maker's name, and such other characters as may be desired on the sheet of metal C.

39 represents two eccentrics on the shaft 7, one on each side of the machine, as shown in Fig. 1. The connecting-rods 40 of the eccentric 39 are pivoted at their upper ends to a cross-bar 41, as shown in Figs. 1 and 2, which moves in vertical guides 42 in the frame B, as shown in Figs. 1, 2, and 4. The cross-bar 41 is provided with three punches 43, which punch the holes $b$ and $c$ (see Fig. 17) in the sheet of metal C, for the stay-pieces and guards.

44 represents arms, one for each punch 43, which bear downward on the sheet of metal C near the point where the punches 43 descend to prevent the withdrawal of the punches from lifting the sheet of metal C. These arms 44 are secured to a cross-bar 45, as shown in Figs. 1 and 4. A similar arm 44', secured to a similar cross-bar 45, is provided for the punch 37, as shown in Figs. 1 and 4.

46 represents two eccentrics on the shaft 1, one on each side of the machine, as shown in Figs. 1 and 3. The connecting-rods 47 of the eccentrics 46 are pivoted at their upper ends to a cross-bar 48, which slides in vertical guides 49, as shown in Fig. 2. On the under side of the cross-bar 48 is secured a knife 50, which severs the successive stay-pieces and guards from the sheet of metal C, as shown in Figs. 3, 4, and 7. As shown in Fig. 3, the cutting-edge of the knife 50 is diagonal to the table 30 to give it a shearing cut.

As shown in Fig. 4, the arrangement of the gearing which operates the cross-bars 35 and 41 and knife 50 is such that each rotation of the shaft 1 causes each to perform one complete operation, and the cam-disk 15 is so arranged on the shaft 10 that while the cross-bars 35, 41, and 48 are up and clear from the sheet of metal C the rollers 26 and 29 feed the sheet of metal C forward the width of a single stay-piece and guard. The punches 37 and knife 50 are arranged to operate at about the same time, while the punches 43 are arranged to operate a short time in advance of the punches 37 and knife 50, so that the strain of these parts in operation will not come at the same time. This arrangement secures a uniform motion to the machine.

The devices above described operate simultaneously with the devices for feeding in the parallel wire D, which I will now describe.

51 is a wire-straightener through which the wire is drawn, as shown in Figs. 10 and 11. This wire-straightener is supported on the outer end of a bracket 52, which is secured to the frame B of the machine, as shown in Figs. 10 and 11.

53 is a wheel, which is secured on the shaft 1, and has a cam-groove in its periphery, in which runs a roller secured on the lever 54, which lever is pivoted at its lower end to the base A and at its upper end is pivotally attached to a clamping device which slides horizontally in guides in the bracket 52.

The clamping device 55 consists of a block 56, adapted to slide in the guides in the bracket 52, and provided with a shoulder near its lower edge, on which is secured a piece of hard metal 57, (see Fig. 12,) over which the wire D passes. Between the block 56 and a plate 58 is pivoted a jaw 59, (see Fig. 12,) which has a roughened surface (see Fig. 15) adapted to engage with the wire D over the plate 57. The rear end of the jaw 59 is pressed downward by a spring 60, which tends to release its bite. A cam-bar 61 is pivoted between the block 56 and the plate 58 in such position that when it is in the position shown in Fig. 12 it will firmly press the jaw 59 against the wire D over the plate 57, thereby firmly clamping the wire; but when the cam-bar 61 is in the position indicated by dotted lines in Fig. 12 it permits the spring 60 to raise the jaw 59 and release its bite.

62 is a pin or projection secured on the bracket 52 in such position that when the lever 54 and clamping device 55 are swung outward the cam-bar 61 will strike it and be moved into the position shown in Fig. 12, thereby clamping the wire D, and when the lever 54 and clamping device 55 are moved inward the wire D is moved inward a distance equal to the length of wire needed for a single stay and guard. At or near the inner limit of motion of the lever 54 and clamping device 55 is placed a second pin or projection 63, against which the cam-bar 61 strikes, moving it to the position indicated by dotted lines in Fig. 12, thereby releasing the bite of the clamping device and allowing the lever 54 and the clamping device 55 to move outward without moving the wire D. The pins 62 and 63 are adjustable horizontally, so that the points of contact with the cam-bar 61 can be adjusted, thereby regulating the length of wire fed into the machine on each reciprocation of the clamping device by regulating the point of clamping and the point of releasing.

64 is a cross-plate secured in the front of the frame B, as shown in Figs. 3 and 8. This cross-plate 64 has a longitudinal slot or opening, the lower face of which is in the same horizontal plane as the opening 65 in the frame B, through which the wire D passes, as shown in Fig. 8. Each inward movement of the clamping device 55 moves the wire D inward on the lower face of the opening in the plate 64 the length necessary for a single stay-piece and guard.

66 is a slide located in the opening in the plate 64, as shown in Figs. 7 and 8. This slide 66 is provided with a groove 67 in its lower face, in which the wire D, resting on the cross-plate 64, is held, as shown in Fig. 7.

68 is a stationary knife secured to the plate 64 at the point where the wire D is to be severed to form a proper length of wire for a single stay-piece and guard, as shown in Figs. 3 and 8.

69 is a movable knife secured to a bar 70, which slides in vertical guides 71. The bar 70 is moved vertically by a cam 72 on the shaft 1, which causes the knife 69 to sever the wire D. The bar 70 will be returned by its own weight; but a spring may be employed, if desired.

73 is a plate secured to the cross-plate 64 near the knife 68, which plate is provided with a spring, (not shown,) which presses it downward. When the knife 69 is moved upward, the plate 73 is pressed upward by the knife 69 and wire D, and when the wire has been severed and the knife 69 moved downward the plate 73 presses the end of the wire D downward below the edge of the knife 68, so that the wire D will be fed into the groove 67 properly at the next movement of the clamping device 55.

74 represents two arms (see Fig. 3) secured to a rocking-bar 75, mounted in brackets 76, secured to the frame B.

77 is an arm secured to a rocking-bar 75 at its upper end, and at its lower end provided with a roller 78, which engages with a cam-disk 79, which is mounted on the shaft 1. A spring 80 presses the arm 77 outward and the arms 74 inward, keeping the arms 74 in contact with the slide 66, as shown in Fig. 7. The slide 66 is pressed outward by two springs 81, which are secured to the cross-plate 64 below the slide 66, as shown in Figs. 7 and 8. The cam 79 is of such form (see Fig. 7) that it moves the slide 66 inwardly quickly and permits it to be returned quickly by the springs 81 on each rotation of the shaft 1. When the slide 66 is moved inward until the groove 67 passes the inner edge of the cross-plate 64, the section of wire in the groove 67 drops onto a slide 82, which moves in vertical guides in the frame B, as shown in Figs. 4 and 7. The upper face of the slide 82, onto which the section of wire D drops, is provided with projections 83 on one side, (see Fig. 7,) which cause the section of wire to rest on the inner edge of the slide 82. The slide 82 is provided with two supports 84—one at each end—as shown in Fig. 5, which supports are provided with rollers that engage with cams 85 on the shaft 1, which raise the slide 82 vertically. The slide 82 will return by gravity; but to insure a prompt return springs 86 are provided, which press downward upon the supports 84.

87 is a second vertically-moving slide, which is provided with two supports 88—one on each side—which are provided with rollers 89, that engage with cams 90 on the shaft 1, as shown in Figs. 3, 5, 6, and 7.

91 is a slide which moves horizontally in an opening in the front of the frame B, as shown in Figs. 5 and 7.

92 is a lever pivoted to the frame B near its center and to the slide 91 at its upper end, as shown in Fig. 7. At its lower end it engages with a cam 93, secured on the shaft 1, which moves the slide 91 forward. The slide 91 is moved backward by a spring 94, secured to the frame B on a bracket 95, as shown in Fig. 7. The slides 82 and 87 are moved upward by their cams 85 and 90 nearly simultaneously in the same vertical plane, and at the same time the slide 91 is moved forward by its cams 93 across the opening in which the slide 82 moves. When the slide 82 reaches the slide 91, it remains stationary, holding the wire D against the slide 91, while the slide 87 continues to move upward, bending up the ends of the wire D at right angles with the main portion, forming the ends d. (Shown in Fig. 9.)

As shown in Fig. 5, the slide 91 is provided with a downward projection 96 at each end, which projections enter recesses 97 in the slide 82, thereby forming a curved portion in the wire D near the point where the ends d are bent up, adapted to receive and hold the wire loops E, as shown in Fig. 9. When the ends of the wire D have been turned up, the slide 87 remains stationary, while the slide 91 recedes and the slide 82 rises, carrying the wire upward to pass its ends d d through the holes b b in the plate C and through the eyes of the loops E, which are fed into position by devices which I will now describe.

98 represents two hoods (see Fig. 1) secured to a table 99, into each of which hoods the operator feeds a loop E, (see Fig. 17,) which has been previously formed. Each hood 98 is provided with a spring 104, under which the loops E are inserted.

100 is a carriage which slides in horizontal guides 101 in the frame B. This carriage 100 is provided with two clamps 102, adapted to receive the wire loops E from the hoods 98 on the table 99, as shown in Fig. 16. Each clamp 102 is provided with a spring or springs 103, which press upon the wire loops E and hold them in position.

105 (see Figs. 4 and 16) are two elbow-levers pivoted to the under side of the table 99, one beneath each hood 98. Each lever 105 is provided with a projection 106 on its upper end, which is adapted to pass through a slot 107 in the table 99 and to prevent the loops E from being pushed out of the hoods 98 by the clamps 102. The lower end of each lever is provided with a weight, which acts to hold the projection 106 in the slot 107, as shown in Fig. 16. To the lower end of each lever 105 is attached a chain 108, which at its other end is attached to the carriage 100, as shown in Figs. 4 and 16, which chains draw the lower ends of the levers 105 upward when the carriage is in the position shown in Fig. 4, thereby withdrawing the projections 106 from the slots 107, permitting the insertion of another loop into each hood 98. The carriage 100 is moved in and out by two levers 109, (see Fig. 3,) which at their upper ends are pivoted to the carriage 100 and near their lower ends are pivoted to the frame B, as shown in Figs. 4 and 7. To the lower end of each lever 109 is pivotally attached a bar 110, which slides in a guide 111 at its inner end. Each bar 110 is provided with a projection 112 on its lower edge, which engages with a cam 113, secured on the shaft 1, as shown in Fig. 7, which moves the bar 110 inward, causing the lever 109 to move the carriage 100 outward. When the acting portion of the cam 113 has passed the projection 112 on the bar 110, a spring 114 draws the upper end of the lever 109 inward, moving the carriage 100 forward to the position shown in Figs. 4 and 7. The engagement of the cam 113 with the projection 112 on the bar 110 causes the carriage 100 to move outward and permits it to return once every rotation of the shaft 1. When the carriage 100 is moved outward, the ends of the wire loops E, which are held in the hoods 98, enter the clamps 102, where they are held by the springs 103. When the carriage is moved forward, the loops E are carried by the clamps 102 forward, and are held in such position that the eyes will be over the ends $d$ of the wire D. Two springs 115, (see Figs. 3 and 7,) secured to the front of the frame B, engage with a carriage 100 near the inner limit of its movement, causing it to stop in proper position without any shock or jar. When the ends of the wire D have been passed through the eyes of the loops E and the holes $b\ b$ in the plate C, the ends $d$ of the wire D are bent down by devices which I will now describe.

116 is a slide which moves in vertical guides 117 in the frame B, as shown in Figs. 1, 2, 3, and 4. To each end of the slide 116 is pivoted a connecting-rod 118, as shown in Figs. 2 and 3, each of which slides vertically in a guide 119 and at its lower end engages with a cam 120 on the shaft 1, as shown in Figs. 2 and 3.

121 is a presser-bar, (see Figs. 7 and 9,) which is adapted to press upon the plate C, holding it firmly against the slide 82 while the plate C for a single stay-piece is being severed from the sheet of metal and the ends of the wire D are being bent down. This presser-bar is provided with two rods 122, which extend up through the slide 116, and are attached to a weight 123, which presses the bar 121 downward. The slide 116 is provided with a recess 124, (best shown in Fig. 9,) which the bar 121 enters when the slide 116 descends.

125 are two pawls pivoted in recesses 126 in the under side of the slide 116—one at each end—adapted to engage with the ends $d$ of the wire D, as shown in Fig. 9. Each pawl 125 is provided with a slot 127, into which projects a pin 128, secured in the slide 116, as shown in Fig. 9, which prevents the pawl from dropping down too far.

129 represents two weights, each provided with a rod 130, which rods extend downward to the slide 116 and engage one with each pawl 125, as shown in Fig. 9. The weights 129 press the pawls 125 downward on the ends $d$ of the wire D, bending them downward upon the plate C, as shown in Fig. 9. After the pawls 125 have bent the ends $d$, as shown in Fig. 9, the cams 120 cause the slide 116 to descend and press downward on the pawls 125, bending the ends $d$ of the wire D down flat against the plate of metal C. When the ends of the wire D have been bent down against the plate and the plate has been severed from the sheet of metal, the stay-piece and guard is complete. The slide 116 then rises and the slide 82 descends, releasing the completed stay-piece and guard, which then falls from the slide 82 over an apron which is not shown.

The operation of the several parts of the machine have been hereinbefore described successively; but it will be understood that each device performs a single operation upon each rotation of the driving-shaft 1 and that many of the devices perform their operations simultaneously. The sheet of metal C is punched and stamped as it passes under the cross-bars 35 and 41, and is advanced by the rollers 26 and 29, so that the holes $b$ are in proper position to receive the ends of the wire D, which wire has been severed and bent up while the sheet of metal was being advanced, and the loops E are fed into the machine so that the ends $d$ of the wire D enter the eyes of the loops before passing through the holes $b$. When the ends *d* of the wire D have passed through the eyes of the loops E and the holes *b* of the plate or sheet of metal C, they are bent downward against the sheet of metal, while the the knife 50 severs the plate for a single stay-piece and guard from the sheet of metal, thus completing the stay and guard.

From the above description of the machine, as illustrated in the drawings, we wish it to be understood that the same is only one of many mechanisms which might be employed for carrying out the main feature of the invention, which is the production by a machine of a completed stay-piece and guard. Many of the mechanisms and devices may be varied or other mechanisms or devices substituted which will produce the same result.

In some instances the holes *a c* in the plate of metal C may not be needed, and in such cases the punches for punching these holes may be omitted, and the stamp 38 may also be omitted, and in case of such omissions only one cross-bar with punches for punching the holes *b* thereon may be employed.

The location of the punches on the cross-bar 35 and 41 for punching the holes *a* and *c* may be varied as may be desired.

The wire loops E, instead of being fed into the clamps or hoods 98 by hand, may be fed into the hoods automatically from or by the machine by which they are made.

What we claim as new, and desire to secure by Letters Patent, is—

1. The combination, in a machine for forming stay-pieces and guards for wire fences, of devices for forming a plate for the stay-piece and guard, with mechanism for feeding wire loops E and mechanism for securing the wire loops to the plate by a wire, substantially as specified.

2. The combination, in a machine for forming stay-pieces and guards for wire fences, of devices for punching and severing a sheet of metal to form a plate for the stay-piece and guard, mechanism for severing and bending a section of wire, and mechanism for securing wire loops E to the plate by means of the bent wire, substantially as specified.

3. The combination, in a machine for forming stay-pieces and guards for wire fences, of mechanism for severing and bending a section of wire, and mechanism for securing the wire to a plate for the stay-piece and guard and to loops E, substantially as specified.

4. The combination, in a machine for forming stay-pieces and guards for wire fences, of devices for feeding in loops E, devices for severing and bending a wire, and mechanism for securing the loops and wire to a plate, substantially as specified.

5. The combination, in a machine for forming stay-pieces and guards for wire fences, of devices for forming a plate for the stay-piece and guard, devices for severing and bending a section of wire, devices for feeding in loops E, and mechanism for securing the plate, wire, and loops together, substantially as specified.

6. In a machine for forming stay-pieces and guards for wire fences, the combination of rollers 26 and 29 for advancing a sheet of metal, and gearing for giving an intermittent motion to the rollers, with mechanism for punching the sheet of metal and severing plates therefrom, and mechanism for holding the plates and securing wire loops, as E, thereon, substantially as specified.

7. In a machine for forming stay-pieces and guards for wire fences, the combination, with mechanism for advancing a sheet of metal by an intermittent motion, mechanism for forming a plate from the sheet of metal, and mechanism for holding the formed plate in position, of mechanism for feeding in wire loops E, mechanism for feeding in a wire, as D, by an intermittent motion, mechanism for severing and bending sections of the wire, and mechanisms for securing the plate, loops, and wire together, substantially as specified.

8. In a machine for forming stay-pieces and guards for wire fences, the combination, with a reciprocating block 56, jaw 59, cam-bar 61, and a device for actuating the block, of pins 62 and 63, substantially as specified.

9. In a machine for forming stay-pieces and guards for wire fences, the combination of a clamping device consisting of a block 56, jaw 59, cam-lever 61, and spring 60 with pins 62 and 63, substantially as and for the purpose specified.

10. In a machine for forming stay-pieces and guards for wire fences, the combination of a cross-plate 64, slide 66, having a groove 67, mechanism for moving the slide horizontally, and mechanism for severing a section of wire, substantially as specified.

11. In a machine for forming stay-pieces and guards for wire fences, the combination of a stationary knife, a movable knife, and mechanism for operating the movable knife with a spring-plate 73, substantially as and for the purpose specified.

12. In a machine for forming stay-pieces and guards for wire fences, the combination of the carriage 100, carrying a clamp or clamps 102, with a table provided with a hood or hoods 98, substantially as and for the purpose specified.

13. In a machine for forming stay-pieces and guards for wire fences, the combination of a table and hood secured thereto, an elbow-lever 105, having a projection 106, with a carriage carrying a clamp, and a chain or cord 108, substantially as and for the purpose specified.

14. In a machine for forming stay-pieces and guards for wire fences, the combination of a horizontally-moving slide 91, having projections 96 on its lower edge, with a vertically-moving slide having recesses 97 on its upper edge adapted to receive the projections 96, and mechanism for operating these slides, substantially as and for the purpose specified.

15. In a machine for forming stay-pieces and guards for wire fences, the combination, with mechanism for severing a plate or section from a sheet of metal, and mechanism for bending the ends of a wire, of a slide 82, a slide 116, moving in the same plane as the slide 82, and a weighted presser-bar on the slide 116, whereby the plate or section is held while being severed and while the ends of the wire are being bent thereon, substantially as specified.

16. In a machine for forming stay-pieces and guards for wire fences, the combination, with a slide 82, of a slide 116, pawls 125, and weights 129, substantially as and for the purpose specified.

17. In a machine for forming stay-pieces and guards for wire fences, the combination, with a carriage 100, carrying clamps, of the lever 109, bar 110, projection 112, cam 113, and spring 114, substantially as and for the purpose specified.

18. In a machine for forming stay-pieces and guards for wire fences, the combination, with a vertically-moving slide 82 and vertically-moving slide 87, of horizontally-moving slide 91, lever 92, and cam 93, substantially as and for the purpose specified.

19. The combination, with a reciprocating block 56, of the jaw 59, and a cam-bar 61, substantially as specified.

SYLVESTER F. DUNCAN.
ARTHUR M. WILLARD.

Witnesses:
ALBERT H. ADAMS,
HARRY T. JONES.